United States Patent [19]

Frederiksen

[11] Patent Number: 5,348,296
[45] Date of Patent: Sep. 20, 1994

[54] POLYURETHANE CLUB WITH CYLINDRICAL CORE

[76] Inventor: Torben Frederiksen, 1680 N. Olive St., Ventura, Calif. 93001

[21] Appl. No.: 97,452
[22] Filed: Jul. 23, 1993
[51] Int. Cl.[5] .......................................... A63B 67/00
[52] U.S. Cl. .............................. 273/84 R; 273/67 R; 273/72 R; 273/67 D; 482/109
[58] Field of Search ................. 273/56, 26 B, 67 R, 273/72 R, 83, 84 R, 84 ES, 67 C, 67 D; 482/109; D21/211; D22/117, 134, 149

[56] References Cited

U.S. PATENT DOCUMENTS

| 143,610 | 10/1873 | McDonald | 273/84 R |
| 3,770,033 | 11/1973 | Gavillet et al. | 273/72 R |
| 4,328,966 | 5/1982 | Migamoto | 273/67 R X |

FOREIGN PATENT DOCUMENTS 0017660 of 1893 United Kingdom ................ 482/109

Primary Examiner—Benjamin H. Layno
Assistant Examiner—William M. Pierce
Attorney, Agent, or Firm—Marvin E. Jacobs

[57] ABSTRACT

A composite bat is formed of a stiff core having a thick sheath of an elastomer such as a polyurethane. The bat can have an oval-shaped handle covered with a high friction grip. The elastomer sheath is resistant to water and oil. The bat is useful to hit and stun or kill fish without rebound. The core can be formed of a pultruded resin-fiberglass composite having good adhesion to the elastomer sheath. The bat can also take the form of a billy club.

4 Claims, 1 Drawing Sheet

POLYURETHANE CLUB WITH CYLINDRICAL CORE

TECHNICAL FIELD

This invention relates to clubs for applying blows to stun or disable an adversary and, more particularly, this invention relates to a club formed of a reinforced resin composite handle containing a sheath of an elastomer in the form of a bat which is used to stun game fish before they are brought aboard a boat.

BACKGROUND OF THE INVENTION

Cylindrical-shaped clubs are used as security devices and also find use in fishing. Large game fish can be dangerous when placed on the deck of a boat. In regulated competition such as tournaments sanctioned by I.G.F., it is not permitted to kill a fish by shooting. Anglers are allowed to stun or kill the fish by clubbing. Many fishermen use a steel club for this purpose such as a length of rod or flat stock. However, the fish is alive and squirming. It is not uncommon for the steel rod to miss the fish or glance off the fish and hit the deck, the railing or body of the boat. The steel rod can break or bend the rail or can puncture or fracture the fiberglass coating or shell of the boat. Many times chunks are removed from the deck or body of the boat. Also when the rod hits a hard surface, the force will transmit up the arm of the fisherman and can cause trauma to his wrist, elbow or shoulder. Iron clubs can rust in a marine environment transferring rust stains to the boat. They also rattle on the deck on a boat.

Aluminum baseball bats or a shorter fish bat made of aluminum have also been used to stun or kill fish. The baseball bat is too long for one person to hold the line in one hand and wield the bat with the other. The aluminum fish bat is shorter but is light and transfers excessive vibration and recoil to the arm of the user. The round grip of a bat provides a less secure grip than a flatter grip especially in a slippery hand wet with sea water.

Clubs used for security protection such as billy clubs also develop recoil when a solid object is hit. Covering a metal club with an elastomer sheath should reduce recoil. However, there is a large difference in the coefficient of expansion between metal and rubber and the adhesion between metal and elastomer is poor. There is a differential in the length of the sheath and metal rod during deflection and after many cycles of deflection and vibration from impact, the elastomer sheath can separate from the rod.

STATEMENT OF THE INVENTION

The composite club of the invention is safe to use and does not degrade or corrode in a marine environment. The composite club of the invention is totally formed of compatible synthetic resin and inorganic or organic reinforcement fibers. It is ergonomically designed to fit the palm of the hand of the user and absorbs force on contact reducing recoil and arm trauma of the user.

The improved club of the invention is formed of a core rod having a grip portion and an upper portion covered by an elastomer sleeve. The rod is preferably formed of a fiber reinforcement and resin composite having good adhesion to the elastomer. A preferred rod contains parallel reinforcement fibers such as fiberglass impregnated with resin by a pultrusion process. This provides improved strength in the axial direction of the rod and permits some deflection of the rod on impact. Parallel fiber reinforcement is less rigid and brittle than random fiber reinforcement.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
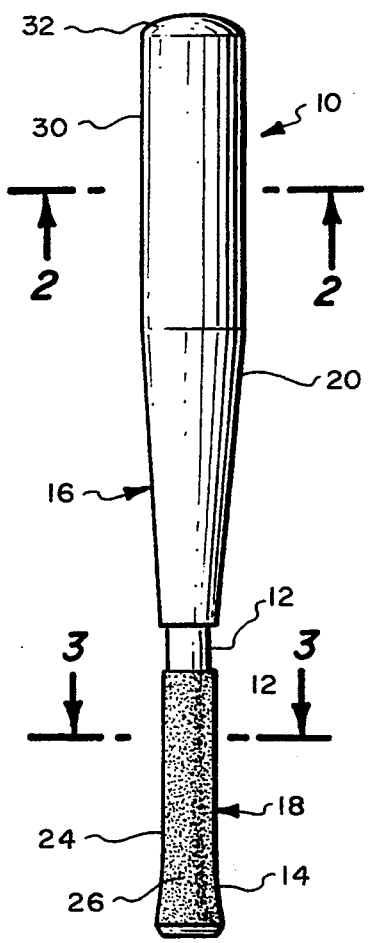
FIG. 1 is a front view in elevation of the composite club of the invention.
Figure 2:
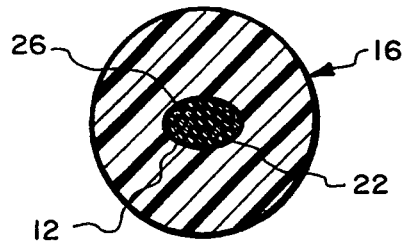
FIG. 2 is a view in section taken along line 2—2 of FIG. 1.
Figure 3:
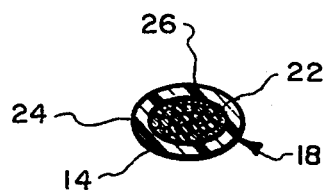
FIG. 3 is a view in section taken along line 3—3 of FIG. 1.

Referring now to FIGS. 1, 2 and 3, the preferred configuration of a composite club is a bat 10 formed of a core rod 12, a handle cover 14 and an elastomer sleeve 16. The rod is preferably ovoid in cross-section. The rod has a handle portion 18 and an upper portion 20 for receiving the elastomer sleeve 16.

The rod 12 is preferably formed of a resin-fiber composite in which the fibers 22 are parallel to the longitudinal axis of the rod. The resin is preferably a resin typically used for resin-fiber composites such as an epoxy, polyester or polyamide thermosetting resin. The reinforcing fibers can be fiberglass, carbon, graphite or a synthetic resin such as Kevlar.

The handle portion 18 of the rod can have concave sides 24 to ergonomically fit the hand of the user and to preferentially orient the bat 10 with the flatter face 26 of the core rod 12 facing the fish prey. The handle portion 18 of the core 12 receives the cover 14. The cover 14 can be in the form of a replaceable grip formed of a plastic having a grip pattern such as perforations to increase friction. The cover 14 can be adhered to the rod 12 with a layer of adhesive, not shown.

The handle portion 18 forms about 20–40% of the length of the bat 10, the remainder being composed of the sleeve 16. The sleeve 16 is cylindrical in cross-section but can taper towards the handle 18. The upper section 30 of the sleeve 16 is the thickest section since that is the area of the bat which develops the most momentum. The sleeve 16 is at least as thick as the wider dimension of the rod 12, usually about 1½ to 3 times as thick. The core rod 12 extends almost to the end 32 of the bat 10. Usually the rod occupies from 90–95% of the length of the bat. The end 32 of the sleeve can be rounded to avoid unintended injury to person or property.

A fish bat is usually form 18–22 inches long, preferably about 20½ inches in length. It can weigh from 24 to 48 ounces, usually around 34 ounces. The lower end of the handle is about 1⅜ to 1¾ inches wide, usually 1⅝ inches. The oval handle in the long direction has a concave configuration and narrows to a width of from 1⅛ to 1⅜ inches, usually 1¼ inches. Generally the handle cover is about 7 inches long and the elastomer sheath is about 13½ inches long. The core rod is preferably completely covered with handle cover and elastomer sheath.

The elastomer sheath has a hardness from 60–80 by the Shore A test, preferably from 65–75 Shore A. The elastomer should be inert to the effects of salt water and have good resistance to aging by ultraviolet radiation from ground level sunlight. Natural rubber degrades in both sunlight and from the effects of salt water. Fish oil and hydrocarbon oil also degrade natural rubber. Synthetic rubbers such as Neoprene also do not function well in this environment. Preferred elastomers are synthetic polyurethanes based on polyols such as ethylene oxide, propylene oxide or polypropylene glycol (PPG), liquid polymers or prepolymers. Suitable commercially available polyols for forming the elastomer sleeve are ADIPRENE resins such as ADIPRENE L-100 or ADIPRENE L-83. The polyols are reacted with polyisocyanates such as toluene diisocyanate or isprophorone diisocyanate to form the urethane elastomer. The reaction can be accelerated or catalyzed by water activated or heat activated amine catalysts such as MOCA.

Figure 4:
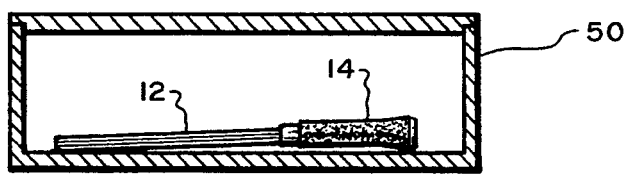
FIG. 4 is a schematic view of a rod with handle disposed in a heating oven.
Figure 6:
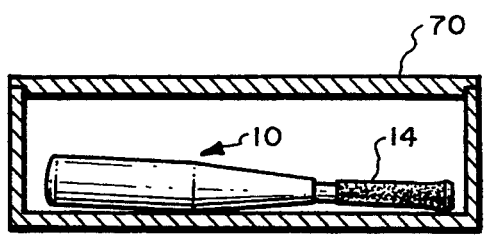
FIG. 6 is a schematic view of the rod with sheath returned to an oven for curing of the sheath.
Figure 5:
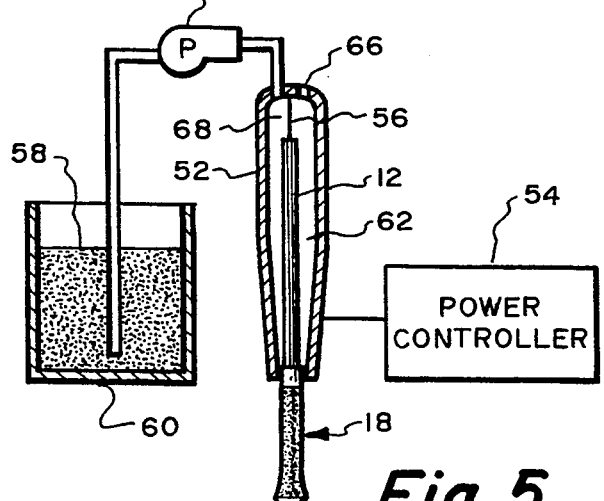
FIG. 5 is a schematic view of an apparatus for casting an elastomer sheath on the preheated rod of FIG. 4.

Referring now to FIGS. 4, 5 and 6, a composite bat 10 is manufactured by preheating the core rod 12 in heating oven 50 to a temperature from 150–250, of preferably 100°–235° F., usually around 220° F. as shown in FIG. 4. The preheated core rod 12 is transferred to a mold 52 as shown in FIG. 5. The rod 12 is suspended by line 56. The mold 52 is heated to a temperature in the same range as the oven, usually 225° F. by means of heater-controller 54. Polyol resin 58 containing diisocyanate and accelerator/catalyst is preheated and mixed in tank 60 to a temperature 30°–50° F. below the temperature of the mold 52.

The preheated resin 58 is pumped into the cavity 62 shaped in the form of a bat by means of a pump 64 until excess resin exits vent hole 66. The inside surface 68 of the cavity 62 can be precoated with a release coating such as a silicone resin. After 10 minutes at mold temperature the composite bat 10 is demolded and is post cured in the oven 70 as shown in FIG. 6 for 8–16 hours at a temperature of 220° F. to 250° F.

Figure 7:
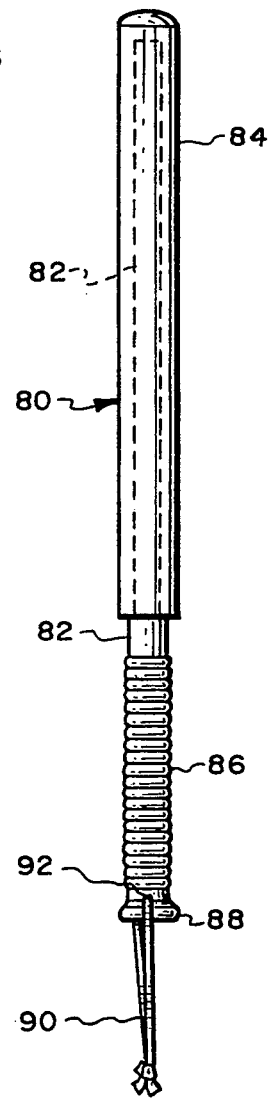
FIG. 7 is a view in elevation of a billy club according to the invention.

The same procedure and structure can be used to fabricate a billy club 80 as shown in FIG. 7. The billy club 80 has a cylindrical fiber-reinforced synthetic resin composite core 82 shown in dotted lines, preferably formed by pultrusion and having parallel reinforcement fibers. A cylindrical sleeve 84 of an elastomer having a Shore A hardness form 60–80 is received on the upper end of the rod 82. A high friction grip handle cover 86 such as a spiral wound grip is received on the lower end. The end of the rod below the grip 86 may have an enlarged knob 88 to prevent the club 80 from slipping out of the palm of the user during use. A lanyard 90 received through an aperture 92 also aids in holding the club 90 when delivering blows to adversary combatants.

It is to be realized that only preferred embodiments of the invention have been described and that numerous substitutions, modifications and alterations are permissible without departing from the spirit and scope of the invention as defined in the following claims.

I claim:

1. A composite bat comprising in combination: a stiff core rod of ovoid cross section, said core rod extending 90 to 95 percent of the end to end length of the bat and having a first portion supporting a handle and a second portion supporting a striking section, said first handle portion forming 20 to 40 percent of the length of the bat, said handle comprising a separable plastic cover of oval shape tightly embracing said ovoid core rod forming a hand grip of oval shape, said striking section comprising a cylindrical elastomer sleeve encasing and bonded to said ovoid core rod.

2. The combination of claim 1 wherein said cylindrical elastomer sleeve includes an integrally molded rounded end cap covering said core rod at an end portion of said bat remote from said handle.

3. The combination of claim 2 wherein said cylindrical elastomer sleeve includes a cylindrical tapered section extending in the direction of the handle.

4. The combination of claim 3 wherein said core rod is formed of a composite resin having parallel reinforcement fibers embedded therein.

* * * * *